United States Patent [19]

Sabbah et al.

[11] Patent Number: 5,433,206
[45] Date of Patent: Jul. 18, 1995

[54] SYSTEM AND A METHOD FOR SIMULTANEOUS, REAL TIME ULTRASOUND IMAGING OF BIOLOGICAL TISSUE AND MEASURING OF BLOOD FLOW VELOCITY

[75] Inventors: Benjamin Sabbah, Haifa; Arie Amara, Mitzpe Gillon, both of Israel

[73] Assignee: Elscint, Ltd., Haifa, Israel

[21] Appl. No.: 267,247

[22] Filed: Jun. 29, 1994

[51] Int. Cl.6 ............................................. A61B 8/00
[52] U.S. Cl. ............................................. 128/661.09
[58] Field of Search ............... 128/660.01, 660.05, 128/661.08, 661.09, 661.10; 73/861.25

[56] References Cited

U.S. PATENT DOCUMENTS

| | | | |
|---|---|---|---|
| 4,453,550 | 6/1984 | Flax | 128/660.01 |
| 4,559,952 | 12/1985 | Angelsen et al. | 128/661.09 |
| 4,934,373 | 6/1990 | Angelsen et al. | 128/661.09 |
| 5,318,028 | 6/1994 | Mitchell et al. | 128/660.08 |

Primary Examiner—George Manuel
Attorney, Agent, or Firm—Sandler, Greeblum & Bernstein

[57] ABSTRACT

A system for simultaneous, real time imaging of biological tissue and measuring of blood flow velocities using the Doppler principle resulting in an improvement in Doppler power spectrum of the blood flow velocity measurements.

20 Claims, 3 Drawing Sheets

SYSTEM AND A METHOD FOR SIMULTANEOUS, REAL TIME ULTRASOUND IMAGING OF BIOLOGICAL TISSUE AND MEASURING OF BLOOD FLOW VELOCITY

FIELD AND BACKGROUND OF THE INVENTION

The present invention relates to a system and a method for simultaneous, real time ultrasound imaging of biological tissue and measuring of blood flow velocity using the Doppler principle.

There exist in the marketplace devices for simultaneous ultrasound imaging of biological tissue and measuring of blood flow velocities based on the Doppler principle. The devices operate by time-sharing an ultrasound transducer between scan and Doppler modes of operation at a 1:1 ratio, that is, the ultrasound transducer is driven in each mode alternately. Operating the device at a 1:1 ratio enables a real time image of the biological tissue to be displayed, however, it restricts the upper velocity of blood flows that can be measured to relatively low values. Attempts to measure velocities greater than the upper limit produces the effect known as aliasing.

Operating the devices at a 1:N ratio where N>1 enables the velocities of fast flowing blood flows to be measured but entails two disadvantages. First, the image of biological tissue is refreshed at too slow a rate for real time imaging. Second, the integrity of the Doppler power spectrum representative of the blood flow velocity is impaired. This impairment is due to the estimation of the Doppler signals which are missing when the device is operating in scan mode as now described with reference to the Doppler power spectrums shown in FIGS. 1a–1c.

The Doppler power spectrum shown in FIG. 1a displays a single harmonic at approximately 1 kHz as rendered by driving the ultrasound transducer at 8 kHz in the Doppler mode of operation only. In comparison, the Doppler power spectrum shown in FIG. 1b displays spurious harmonics at approximately −3 kHz, −1 kHz and 3 kHz in addition to the predominant 1 kHz harmonic as rendered by driving the ultrasound transducer at 8 kHz at a 1:4 ratio between the scan and Doppler modes of operation. The spurious harmonics can be quantified as contributing to a missing signal estimator (MSE) value of 4089.

To partly remedy this deterioration, the missing Doppler signals are typically estimated as a function of measured Doppler signals. Typical estimation techniques range from a simple linear interpolation between two immediately adjacent measured signals to more sophisticated estimation techniques as known in the art. As evidenced by the Doppler power spectrum of FIG. 1c, even a linear interpolation of missing Doppler signal manages to considerably lower the MSE value from 4098 to 318.3. However, it will be noted that the spurious harmonics in the Doppler power spectrum still remain albeit at a reduced energy.

Therefore, it would be highly desirable to have a system and a method for simultaneous, real time ultrasound imaging of biological tissue and measuring of blood flow velocities using the Doppler principle which improves the integrity of the Doppler power spectrums of the blood flow velocity measurements.

It would also be highly desirable that the system and the method be highly robust so as to be both equally applicable over a wide range of pulse repetition frequencies and computationally simple.

SUMMARY OF THE INVENTION

The main object of the present invention is for a system and a method for simultaneous, real time ultrasound imaging of biological tissue and measuring of blood flow velocities using the Doppler principle which improves the integrity of the Doppler power spectrums of the blood flow velocity measurements.

Hence, according to one aspect of the present invention, there is provided a system for simultaneous, real time ultrasound imaging of biological tissue and measuring of blood flow velocity, comprising: (a) an ultrasound transducer; (b) a signal generator for driving the ultrasound transducer in i) a scan mode of operation for imaging biological tissue, and ii) a Doppler mode of operation for measuring blood flow velocity, in which Doppler signals are missing when the ultrasound transducer operates in the scan mode of operation; (c) a randomizer for randomizing the activation of the signal generator; (d) a display for displaying an image of biological tissue; and (e) a display for displaying a Doppler power spectrum of a blood flow velocity measurement.

The randomizer randomizes the activation of the signal generator between the scan and Doppler modes of operation at a ratio from about 1:2 to about 1:8 according to an equal distribution function or Gaussian function. The functions preferably have a mean value of 4 and a standard deviation from about 1 to about 3. The system also preferably includes a signal processor for estimating the missing Doppler signals using at least first order interpolation.

According to another aspect of the present invention, there is also provided a method for simultaneous, real time ultrasound imaging of biological tissue and measuring of blood flow velocity, comprising the steps of: (a) providing an ultrasound transducer; (b) driving the ultrasound transducer in: i) a scan mode of operation for imaging biological tissue, and ii) a Doppler mode of operation for measuring blood flow velocity, where Doppler signals are missing when the ultrasound transducer operates in the scan mode of operation; (c) randomizing the step of driving; (d) displaying an image of biological tissue; and (e) displaying a Doppler power spectrum representative of a blood flow velocity measurement.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for simultaneous, real time ultrasound imaging of biological tissue and measuring blood flow velocity using the Doppler principle.

The system and the method are particularly designed to remove the spurious harmonics from the Doppler power spectrum rendered when an ultrasound transducer is driven in a conventional time-shared fashion between scan and Doppler modes of operation.

The principles and operation of the system and the method according to the present invention may be better understood with reference to the drawings, which are illustrative only, and which demonstrate examples of various aspects of the system and the method according to the present invention.

Figure 2:
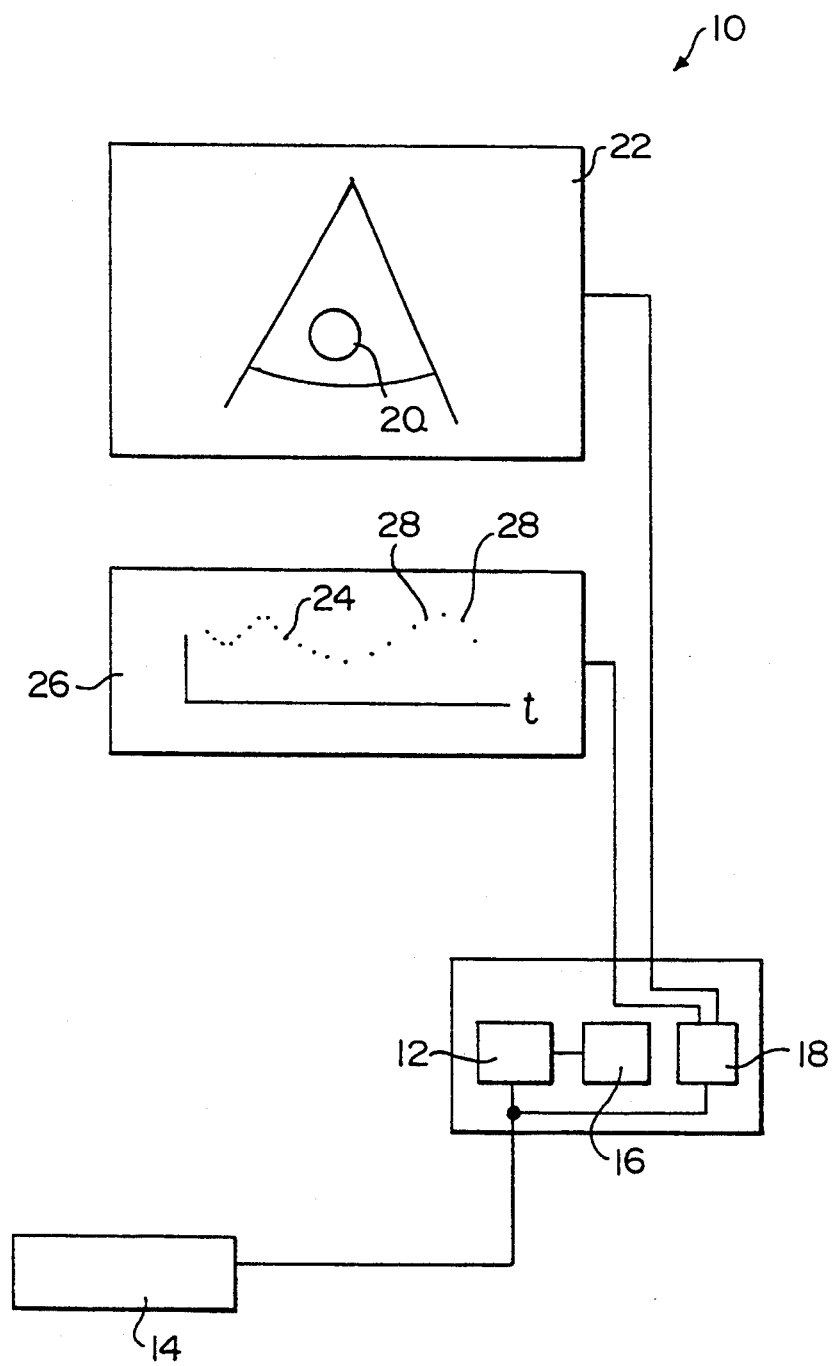
FIG. 2 shows a system for simultaneous, real time ultrasound imaging of biological tissue and measuring of blood flow velocity using the Doppler principle according to the teachings of the present invention.

Referring now to the drawings, FIG. 2 illustrates a system, generally designated 10, constructed and operative according to the teachings of the present invention, for simultaneous, real time ultrasound imaging of biological tissue and measuring of blood flow velocity using the Doppler principle.

System 10 includes a signal generator 12 for driving an ultrasound transducer 14 for transmitting and receiving ultrasonic energy in a time-shared fashion between a scan mode of operation for imaging biological tissue and a Doppler mode of operation for measuring blood flow velocity.

Figure 3:
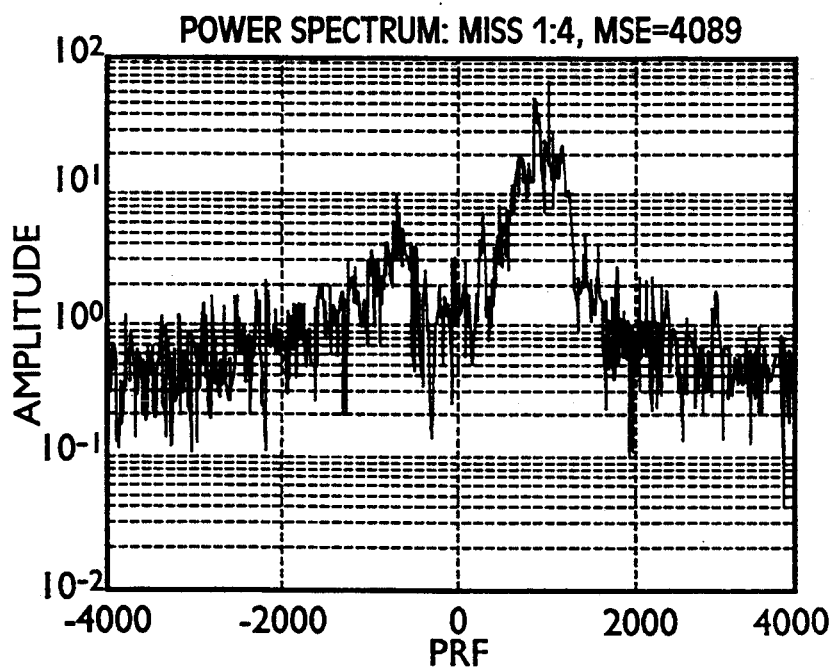
FIG. 3 shows the Doppler power spectrum of FIG. 1c improved by the use of system of FIG. 2.

In sharp contrast to conventional systems described in the Background of the Invention in which ultrasound transducer 14 is activated at a fixed ratio between the scan and Doppler modes of operation, it is a particular feature of the present invention that system 10 also includes a randomizer 16 for randomizing the activation of signal generator 12. The benefit of randomizing the time sharing of transducer 14, thereby establishing temporally randomized missing Doppler signals when transducer 14 is driven in the scan mode of operation, is explained below with reference to FIG. 3.

A wide range of discrete functions can be implemented by randomizer 16 including, but not limited to, an equal distribution function, a Gaussian function, etc. Preferably, discrete functions having mean values of 4 and a standard deviation of 1, 2 or 3 are implemented although means values from about 2 to about 8 can also be used. It can be readily appreciated that randomizer 16 is equally operable over a wide range of pulse repetition frequencies.

A signal processor 18 processes the signals received by transducer 14 to produce an image 20 of scanned biological tissue typically shown on a 512×512 display 22 and a Doppler power spectrum 24 of blood flow velocities displayed on a display 26. The excursion of points 28 from the x axis of Doppler power spectrum 24 is representative of its frequencies.

As described in the Background of the Invention, signal processor 18 preferably estimates the missing Doppler signals as a function of measured Doppler signals proximate to the missing Doppler signals by any one of a wide range of estimation techniques. Such techniques range from simple linear interpolation between two immediately adjacent measured Doppler signals to more sophisticated estimation techniques, for example, as performed by the Missing Signal Estimator described in accordance U.S. Pat. No. 4,934,373 entitled "Method and Apparatus for Synthesizing a Continuous Estimate Signal from Segments of a Gaussian Signal Provided by Ultrasonic Doppler Measurement on a Fluid Flow" which issued on 19 Jun. 1990.

Figure 1A:
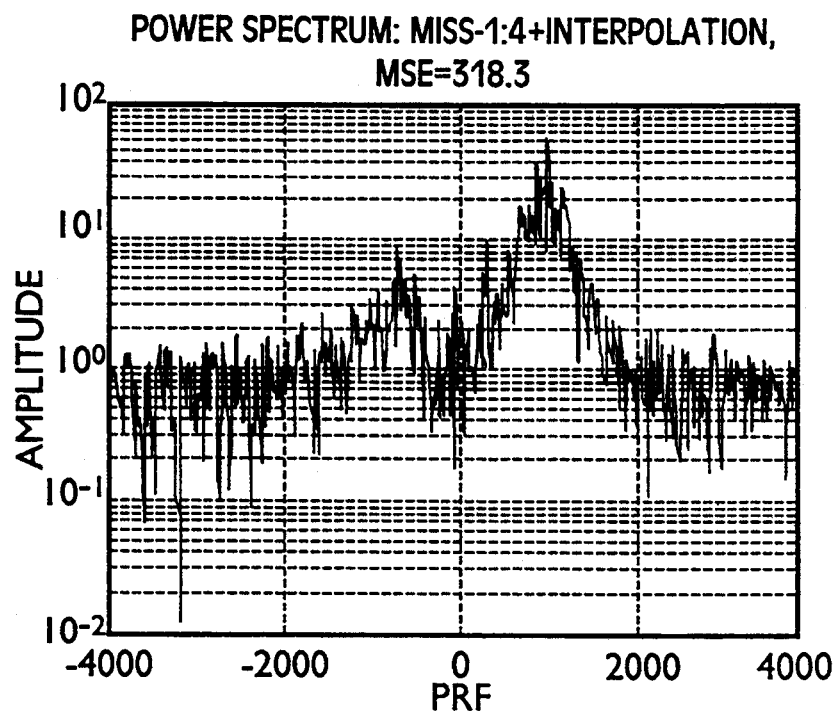
FIG. 1a shows the Doppler power spectrum of a blood flow velocity measurement as rendered by a transducer driven at 8 kHz in the Doppler mode of operation only.
Figure 1B:
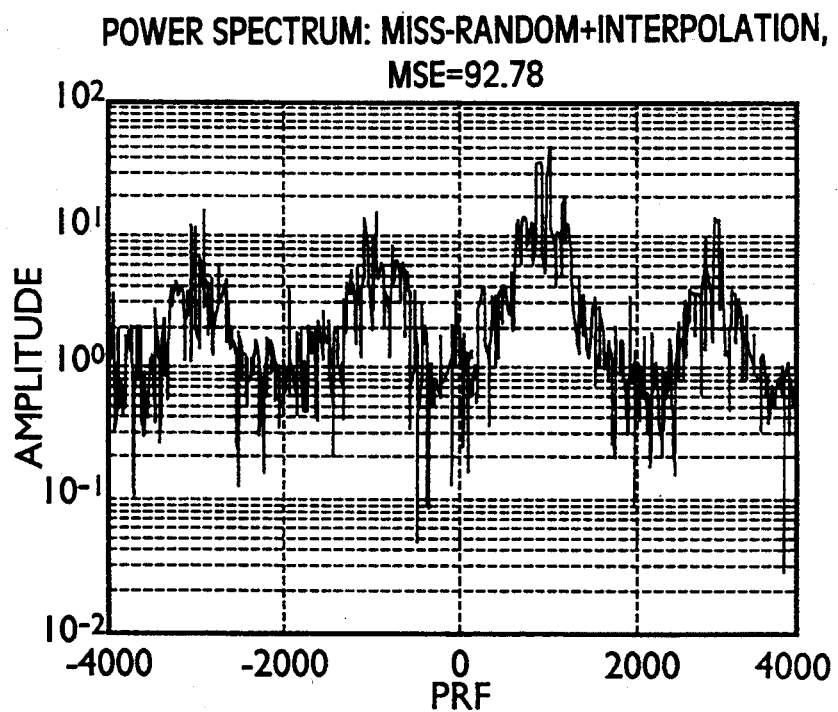
FIG. 1b shows the Doppler power spectrum of a blood flow velocity measurement as rendered by a transducer driven at 8 kHz in a conventional 1:4 time-shared fashion between the scan and Doppler modes of operation.
Figure 1C:
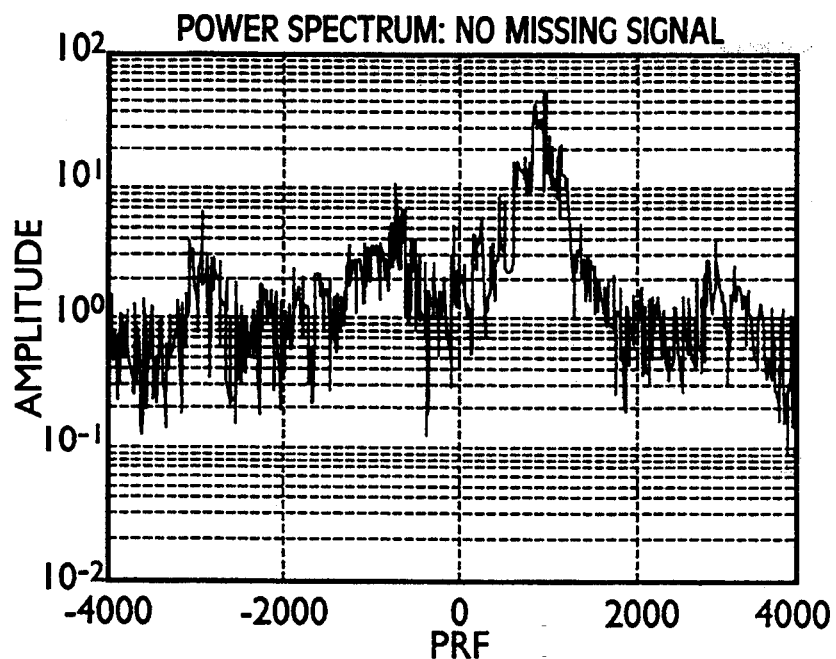
FIG. 1c shows the Doppler power spectrum of FIG. 1b improved by using linear estimation for estimating missing Doppler signals.

The improved integrity of the Doppler power spectrum as rendered by randomizing the activation of signal generator 12 can be clearly seen on comparing Doppler power spectrum 24 to the Doppler power spectrums shown in FIGS. 1a and 1c. The comparison reveals that Doppler power spectrum 24 has a contour closer to that of FIG. 1a than FIG. 1c as evidenced by it having only one harmonic frequency. In particular, using the same 8 kHz Doppler frequency as described above, system 10 renders Doppler power spectrum 24 having a harmonic frequency at approximately 1 kHz and a greatly reduced MSE value of 92.78.

While the invention has been described with respect to a limited number of embodiments, it will be appreciated that many variations, modifications and other applications of the invention may be made.

What is claimed is:

1. A system for simultaneous real time imaging of biological tissue and measuring blood flow velocity, comprising:
   a) an ultrasound transducer;
   b) a signal generator for driving said ultrasound transducer in:
      (i) a scan mode of operation for imaging biological tissue and
      (ii) a Doppler mode of operation for measuring blood flow velocity where Doppler signals are missing when said ultrasound transducer is driven in said scan mode of operation;
   c) said signal generator including a randomizer for randomizing the activation of said signal generator to operate either in the scan mode or in the Doppler mode over random time periods;
   d) a signal processor for receiving echo signals from said biological tissue and from flowing blood; said signal processor further processing said received echo signals to provide image data;
   e) a first display for displaying an image of biological tissue based on said image data obtained from processing said echo signals received from said biological tissue; and
   f) a second display for displaying a Doppler power spectrum representative of the blood flow velocity measurement based on said echo signals received from said flowing blood and estimates of the missing Doppler signals.

2. The system as in claim 1, wherein said randomizer randomizes the activation of said signal generator between said scan and Doppler modes of operation at a ratio of from about 1:2 to about 1:8.

3. The system as in claim 1, wherein said randomizer randomizes the activation of said signal generator according to an equal distribution function.

4. The system as in claim 3, wherein said equal distribution function has a mean value of 4.

5. The system as in claim 5, wherein said equal distribution function has a standard deviation from about 1 to about 3.

6. The system as in claim 1, wherein said randomizer randomizes the activation of said signal generator according to a Gaussian function.

7. The system as in claim 6, wherein said Gaussian function has a mean value of 4.

8. The system as in claim 7, wherein said Gaussian function has a standard deviation from about 1 to about 3.

9. The system of claim 1 further comprising:
a signal processor including a missing signal estimator for estimating said missing Doppler signals.

10. The system as in claim 9, wherein said signal processor estimates said missing Doppler signals using at least first order interpolation.

11. A method for simultaneous, real time ultrasound imaging of biological tissue and measuring of blood flow velocity comprising the steps of:
examining a patient using an ultrasound transducer;
transmitting ultrasound signals from said ultrasound transducer in a Doppler mode of operation for measuring blood flow velocity during first time periods,
interrupting the Doppler mode of operation to use the ultrasound transducer to perform a scan mode for imaging biological tissue during second time periods, said Doppler signals being missing when the ultrasound transducer operates in the scan mode of operation
randomizing the length of the time periods during which the ultrasound transducer is operated in the first and second time periods;
receiving signals from said ultrasound transducer during both the scan mode of operation and the Doppler mode of operation;
estimating the missing Doppler signals to provide estimated missing Doppler signals;
processing said received signals to provide and refresh images of biological tissue when said transducer is operating in the scan mode;
processing said received signals to provide a Doppler power spectrum representative of a blood flow velocity measurement when the ultrasound transducer is operating in the Doppler mode; and
displaying images of the biological tissue based on the signals received during the scan mode and displaying a Doppler power spectrum based on the signals received and estimated when the transducer is operating in a Doppler mode.

12. The method as in claim 11, wherein said step of randomizing randomizes the driving of the transducer between the scan and Doppler modes of operation at a ratio of from about 1:1 to about 1:8.

13. The method as in claim 12, wherein said step of randomizing randomizes the driving of the transducer according to an equal distribution function.

14. The method as in claim 13, wherein the equal distribution function has a mean value of 4.

15. The method as in claim 14, wherein said equal distribution function has a standard deviation from about 1 to about 3.

16. The method as in claim 11, wherein said step of randomizing randomizes the driving of the transducer according to a Gaussian function.

17. The method as in claim 16, wherein the Gaussian function has a mean value of 4.

18. The method as in claim 17, wherein said Gaussian function has a standard deviation from about 1 to about 3.

19. The method of claim 11, further comprising the step of estimating the missing Doppler signals.

20. The method as in claim 19, wherein said step of estimating the missing Doppler signals uses at least first order interpolation.

* * * * *